United States Patent
Helmersson et al.

(10) Patent No.: US 7,804,931 B2
(45) Date of Patent: Sep. 28, 2010

(54) SPACER AND A FUEL UNIT FOR A NUCLEAR PLANT

(75) Inventors: Sture Helmersson, Kolbäck (SE); Leif Larsson, Västerås (SE); Olov Nylund, Västerås (SE); Håkan Söderberg, Västerås (SE)

(73) Assignee: Westinghouse Electric Sweden AB (SE)

( * ) Notice: Subject to any disclaimer, the term of this patent is extended or adjusted under 35 U.S.C. 154(b) by 374 days.

(21) Appl. No.: 10/585,910

(22) PCT Filed: Jan. 10, 2005

(86) PCT No.: PCT/SE2005/000015

§ 371 (c)(1),
(2), (4) Date: Jul. 12, 2006

(87) PCT Pub. No.: WO2005/069308

PCT Pub. Date: Jul. 28, 2005

(65) Prior Publication Data
US 2008/0267339 A1    Oct. 30, 2008

(30) Foreign Application Priority Data
Jan. 15, 2004   (SE) .................................. 0400066

(51) Int. Cl.
*G21C 3/34* (2006.01)
(52) U.S. Cl. .................... 376/438; 376/439; 376/442; 376/462
(58) Field of Classification Search .................. None
See application file for complete search history.

(56) References Cited

U.S. PATENT DOCUMENTS

| | | | | |
|---|---|---|---|---|
| 2,558,523 A | * | 6/1951 | Luther | 420/474 |
| 3,419,363 A | * | 12/1968 | Sliney | 428/545 |
| 3,664,924 A | * | 5/1972 | Krawiec | 376/442 |
| 4,038,132 A | * | 7/1977 | Pearson | 376/282 |
| 4,172,761 A | * | 10/1979 | Raven et al. | 376/462 |
| 4,594,216 A | * | 6/1986 | Feutrel | 376/442 |
| 4,698,204 A | * | 10/1987 | Taleyarkhan | 376/439 |
| 4,740,351 A | * | 4/1988 | Katsumizu et al. | 376/446 |
| 5,178,825 A | * | 1/1993 | Johansson | 376/438 |
| 5,225,154 A | * | 7/1993 | Kanno et al. | 376/416 |
| 5,331,679 A | * | 7/1994 | Hirukawa | 376/439 |
| 5,363,422 A | * | 11/1994 | Nylund et al. | 376/442 |
| 5,416,812 A | * | 5/1995 | Matzner | 376/371 |
| 5,519,747 A | * | 5/1996 | Johansson et al. | 376/442 |

(Continued)

FOREIGN PATENT DOCUMENTS

EP    0 433 493 A1    12/1989

(Continued)

*Primary Examiner*—Rick Palabrica
(74) *Attorney, Agent, or Firm*—Michaud-Kinney Group LLP

(57) ABSTRACT

The invention refers to a spacer for holding a number if elongated fuel rods intended to be located in a nuclear plant and to a fuel unit having such spacers. The spacer encloses a number of cells, which each has a longitudinal axis and is arranged to receive a fuel rod in such a way that the fuel rod extends in parallel with the longitudinal axis. Each cell is formed by a sleeve-like member. Each sleeve-like member is manufactured in a sheet-shaped material that is bent to the sleeve-like shape.

21 Claims, 8 Drawing Sheets

U.S. PATENT DOCUMENTS

| | | |
|---|---|---|
| 5,666,389 A | 9/1997 | Andersson et al. |
| 5,675,621 A * | 10/1997 | Croteau et al. ............... 376/441 |
| 5,875,223 A * | 2/1999 | Nylund ....................... 376/439 |
| 6,415,011 B1 * | 7/2002 | Helmersson ................. 376/439 |
| 6,608,881 B2 * | 8/2003 | Oh et al. ..................... 376/439 |
| 6,901,128 B2 * | 5/2005 | Mori et al. ................... 376/310 |

FOREIGN PATENT DOCUMENTS

| | | |
|---|---|---|
| JP | 6148370 | 5/1994 |
| JP | 7225291 | 8/1995 |

* cited by examiner

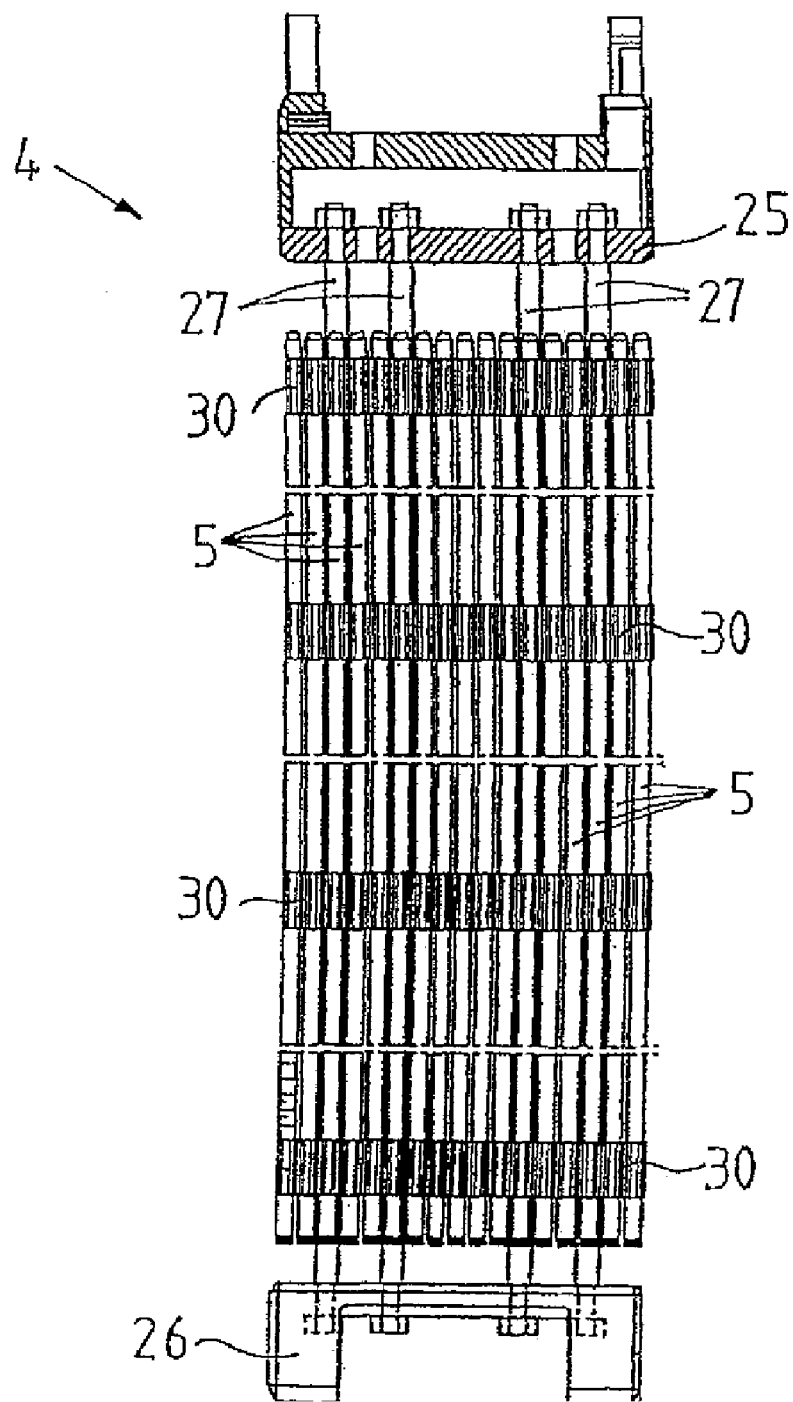

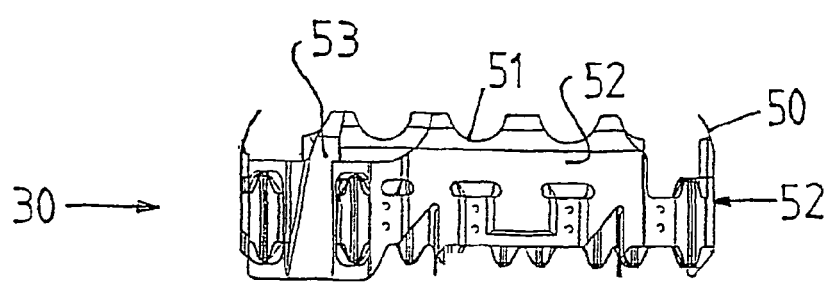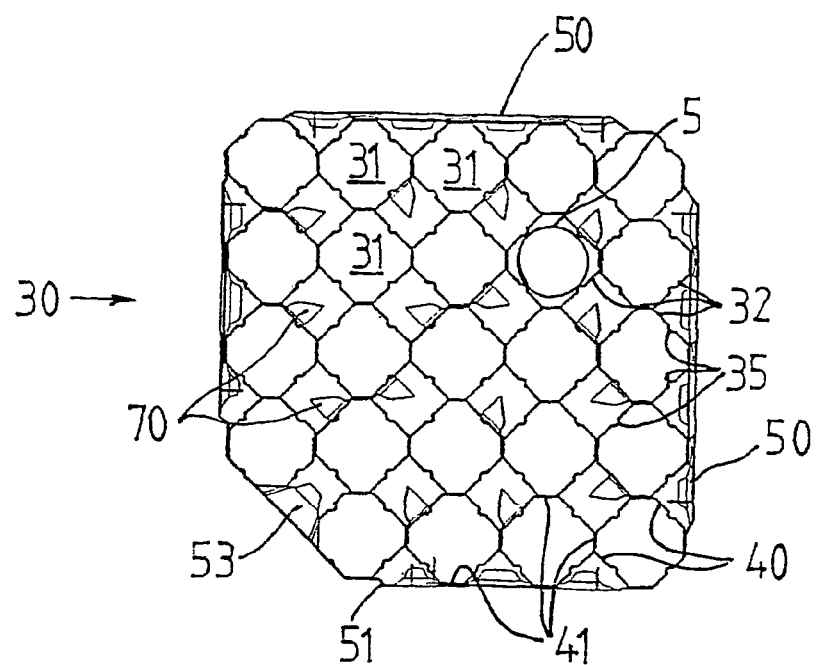

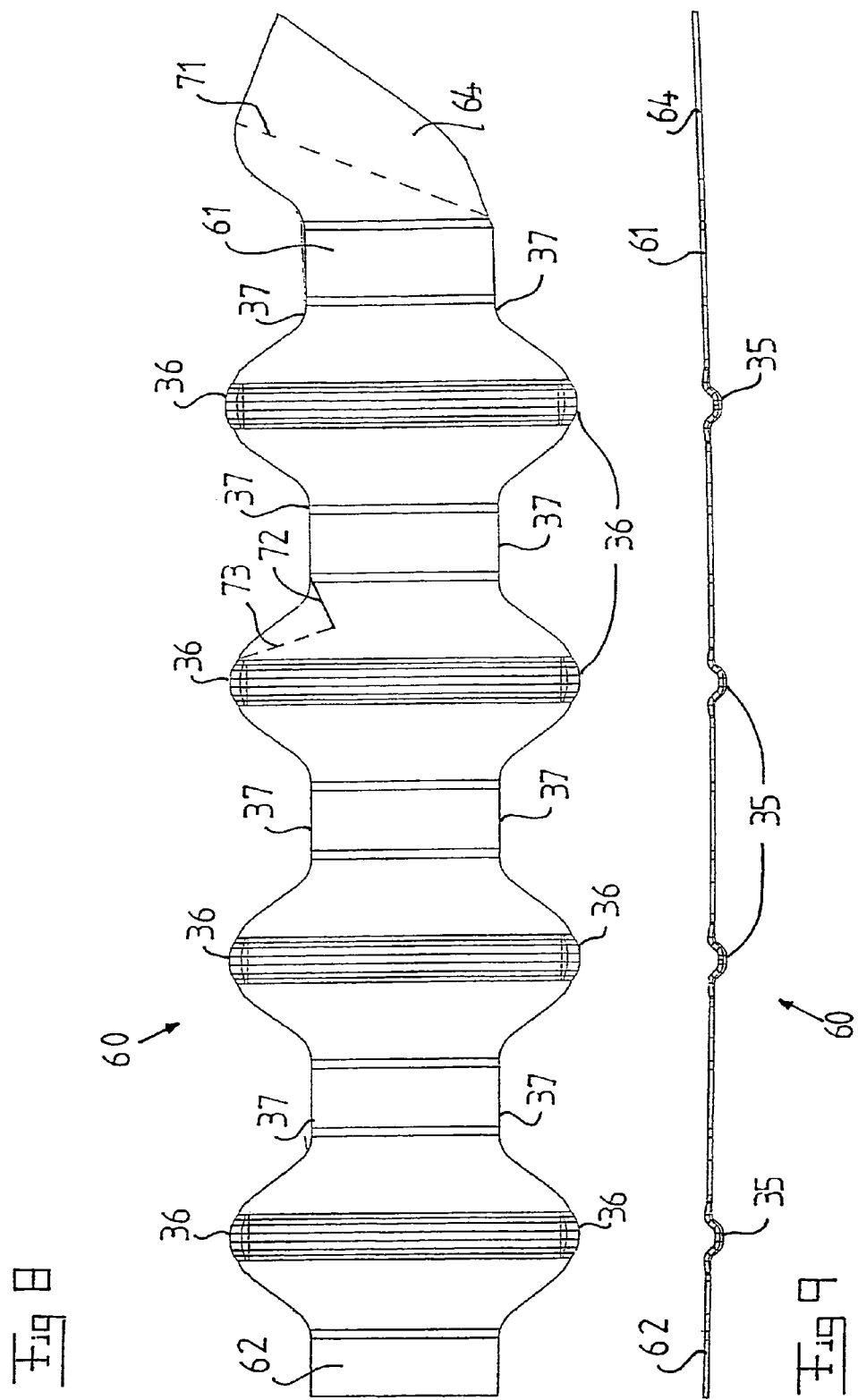

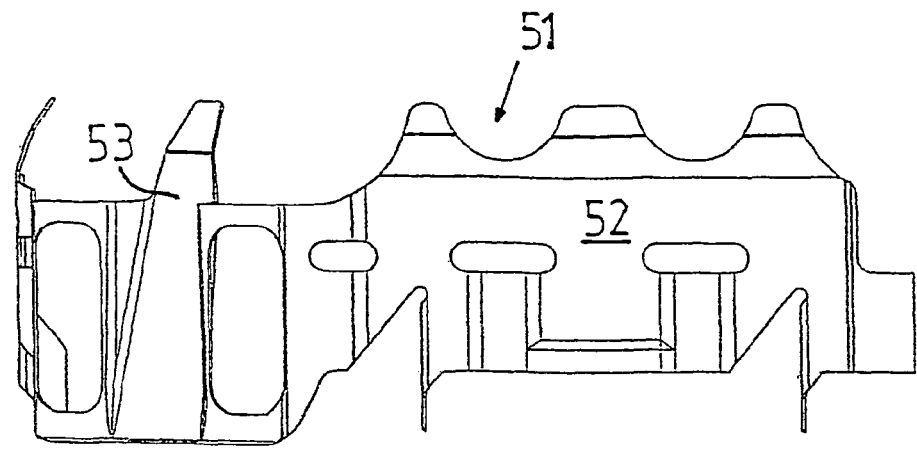
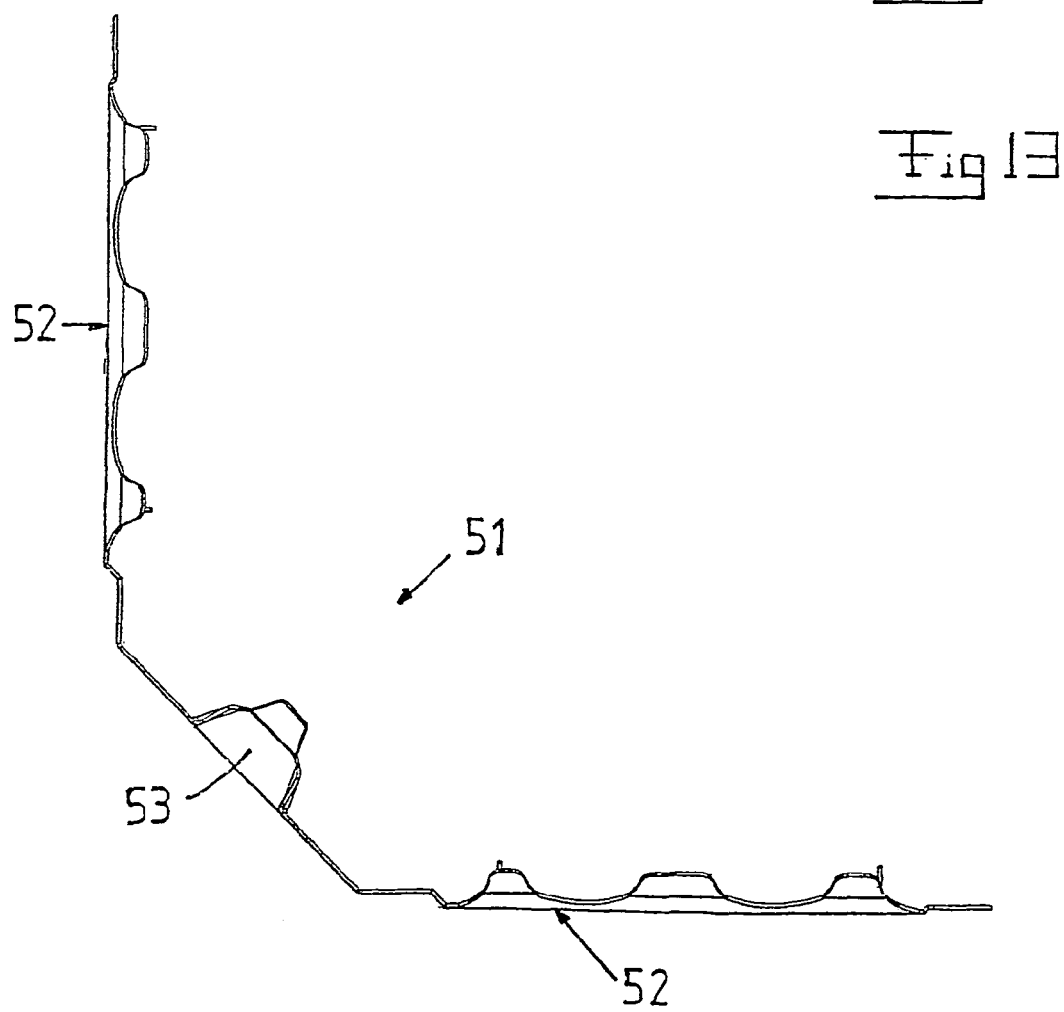
Fig 12
Fig 13

SPACER AND A FUEL UNIT FOR A NUCLEAR PLANT

TECHNICAL FIELD OF THE INVENTION

The present invention refers generally to a spacer for holding a number of fuel rods in a nuclear plant of a light water type, especially a boiling water reactor, BWR, or a pressure water reactor, PWR.

More specifically, the present invention refers to a spacer for holding a number of elongated fuel rods intended to be located in a nuclear plant, wherein the spacer encloses a number of cells, which each has a longitudinal axis and is arranged to receive a fuel rod in such a way that the fuel rod extends in parallel with the longitudinal axis, and each cell is formed by a sleeve-like member.

The invention also refers to a fuel unit for a nuclear plant including a number of elongated fuel rods and number of spacers for holding the fuel rods, wherein the spacers enclose a number of cells, which each has a longitudinal axis and is arranged to receive one of the fuel rods in such a way that the fuel rod extends in parallel with the longitudinal axis, and each cell is formed by a sleeve-like member.

BACKGROUND OF THE INVENTION

In a reactor for a nuclear plant of the type defined above, a large number of elongated fuel units are arranged in the core of the reactor. Each fuel unit includes a number of elongated fuel rods. Each fuel rod includes an elongated cladding tube and a number of fuel pellets, which are provided in a pile in the cladding tube. The fuel rods in the fuel unit are maintained by means of a number of spacers, for instance 6-10 spacers, which are distributed along the length of the fuel unit. Each spacer defines cells for receiving the fuel rods. The spacers thus hold the fuel rods in a correct position in the fuel unit and have the function to ensure the maintaining of a constant mutual distance between the fuel rods during the operation of the reactor.

In a boiling water reactor, the fuel rods are normally enclosed in casings, so called boxes. Each box includes a relatively large number of fuel rods and forms together with these fuel rods a so-called fuel assembly, which can be lifted into and out of the core of the reactor. Each fuel assembly may include one or several fuel units. JP-7225291 discloses a fuel assembly having one such fuel unit. U.S. Pat. No. 5,875,223 discloses a fuel assembly having four such fuel units.

The core is submerged in a coolant, normally water, which functions both as coolant and as moderator. The fuel units and fuel rods are normally provided substantially vertically in the reactor. The coolant normally flows from below and upwardly. It is important to maintain a proper cooling of the fuel rods in the reactor. In a boiling water reactor it is especially critical to obtain a proper cooling in the upper part of the fuel rods where a significant part of the coolant (water) has been converted to steam. In the upper part of the fuel assembly, the coolant thus prevails in a two-phase state, wherein the liquid state partly flows as a film on the different parts of the fuel assembly, inter alia the surfaces of the fuel rods, the spacers and the inner side of the casing, and partly as droplets in the steam flow. If the coolant film on the surfaces of the fuel rods is not maintained an isolating steam layer is formed on the fuel rod leading to a quick temperature increase, so called dry-out, which can lead to defects of the cladding tubes.

The design of the spacers influences the flowing of the coolant and thus the cooling of the fuel rods. It is known to provide the spacers with deflection members provided for deflecting the coolant towards the fuel rods. Such deflecting members have the disadvantage that they, if they are used to a too large extent, result in a substantial increase of the pressure drop coefficient of the spacer. The percentage of steam is highest in the upper part of the fuel assembly. Due to the high percentage steam in the upper part of the fuel assembly, the pressure drop frequently is higher in this part than in the lower part of the fuel assembly. The larger the difference in pressure drop between the upper part of the fuel assembly and lower part, the higher the risk that the core becomes unstable. In order to give the fuel assembly proper stability properties, it is aimed at a low-pressure drop in the upper part of the fuel assembly.

There are spacers of a plurality of different types, for instance spacers formed by crossing sheets, spacers where the cells are formed by open elements having support points and spring members and spacers formed by sleeve-like members welded together. The spacers used today are normally manufactured of zirconium-based alloys (Zircaloy), nickel-based alloys (Inconel), combinations of these alloys or stainless steel. The present invention refers to a spacer formed by sleeve-like members.

A spacer of the kind initially defined is disclosed in U.S. Pat. No. 5,875,223. The known spacer thus includes welded sleeves forming the cells mentioned above. Each of the sleeves has a lower edge and an upper edge. The upper edge is parallel to a plane whereas the lower edge has a wave-shape with wave peaks and wave valleys. The purpose of this design of the lower edge is to prevent possible debris particles in the coolant from getting caught in the spacer, and thus to reduce the wear of the fuel rods.

JP-6-148370 discloses a sleeve spacer for a boiling water reactor. Each sleeve has inwardly directed projections for abutting the fuel rod extending through the sleeve. The projections extend merely over a small part of the length of the sleeve. Each sleeve is also according to one example at the lower end provided with a bevel. According to another example, each sleeve has a wave shape at the lower end of the sleeve.

JP-7-225291 discloses another sleeve spacer for a boiling water reactor. The circular cylindrical sleeves are here provided with an upper, downstream end, which has triangular or rectangular projections extending upwardly. The lower end of the sleeve appears to be straight. Each sleeve may also include inwardly directed projections, which extend over merely a part of the length of the sleeve for abutting the fuel rod extending through the sleeve.

U.S. Pat. No. 5,331,679 discloses a further variant of a sleeve spacer having substantially circular cylindrical sleeves. The spacer is kept together by means of a band extending around the outer periphery of the spacer. Each sleeve has relatively short inwardly directed projections, which together with a spring element form abutment points against the fuel rod extending through the sleeve. Both the lower edge and the upper edge may according to one embodiment have a wave-like shape with wave peaks and wave valleys. The wave peaks of the upper edge appear to be aligned to a respective wave valley of the lower edge.

When designing a spacer consideration has to be taken to a plurality of different requirements, which at least partly are contradictory.

1) The spacer shall be sufficiently mechanically strong to reduce the bending and vibration of the fuel rods and to resist large thermal and hydraulic forces also at dimensioning events such as plant accidents and earthquakes.
2) The spacer has to be able to resist axial and radial dimension changes of the fuel rods.

3) The spacer has to give sufficient abutment surface to the fuel rods for minimising local wear and the risk for defects of the fuel rods.
4) The spacer shall be provided with a minimal amount of material for minimising the neutron absorption.
5) The spacer shall be designed to give a minimal flow resistance and thus a small pressure drop.
6) The spacer shall be designed in such a way that possible debris particles in the coolant do not get caught in the spacer in such a way that these debris particles can subject the fuel rods to wear.
7) The spacer shall be designed in such a way that it provides a proper cooling of the fuel rods through a suitable mixing of the coolant.
8) The spacer shall be manufactured in a relatively easy and inexpensive manner.

SUMMARY OF THE INVENTION

The object of the present invention is to provide a spacer, which has a mechanical strength for reducing the bending and the vibration of the fuel rods, and for resisting large thermal and hydraulic forces, and which withstand axial and radial dimension changes of the fuel rods.

A further object is to provide a spacer requiring a small amount of material in order to minimise the neutron absorption.

A further object is to provide a spacer giving a low flow-resistance.

A further object is to provide a spacer, which ensures a proper cooling of the fuel rods.

The purpose is achieved by the spacer initially defined, which is characterised in that substantially each sleeve-like member is manufactured in a sheet-shaped material that is bent to the sleeve-like shape.

Such a sleeve-like member may be manufactured in an easy manner. Since the starting material is sheet-shaped and not tubular in contrast to the prior art, the thickness of material may be made thin to reasonable costs. Possible shaping and working of the sleeve-like member may also be made in an easy manner before the sheet-shaped material is bent.

According to an embodiment of the invention, the sheet-shaped material has, before said bending, a first connection portion in the proximity of a first end of sheet-shaped material and a second connection portion in the proximity of a second end of the sheet-shaped material, wherein the first end overlaps the second end of the sleeve-like member after said bending. Since the sheet-shaped material may have a small thickness of material, such an overlap over a short part of the periphery of the sleeve-like member can be permitted without giving the overlap any noticeable negative influence on the flow resistance. Advantageously, the first connection portion and the second connection portion may be permanently connected to each other by means of at least one weld joint. Said weld joint may include a spot weld.

The nuclear plant is arranged to permit re-circulation of a coolant flow and the spacer is arranged to be located in the coolant flow, wherein the spacer according to a further embodiment of the invention may include at least one vane for influencing the coolant flow. Such an influence may involve guiding the coolant flow in a direction towards at least one adjacent fuel rod and/or creating turbulence in the coolant flow. In such a way a proper cooling is ensured and dry-out prevented. Advantageously, said vane is formed by a portion of the material, which extends from the first connection portion. Such a vane may be provided in an easy manner in connection with the manufacturing of the sleeve-like member and the shaping of the sheet-shaped material to be bent to the sleeve-like member. In connection with this bending operation, the vane may also be bent outwardly to a suitable angle so that said vane is inclined in relation to the longitudinal axis.

According to a further embodiment of the invention, the sleeve-like member has a thickness of the material, which is less than 0.24 mm, preferably less than or equal to 0.20 mm and more preferably less than or equal to 0.18 mm. By means of such a thin thickness of the material, two substantial advantages are achieved, namely a small amount of material of the spacer, which provides a low neutron absorption, and a low flow resistance through the spacer, thus providing a low-pressure drop in the reactor.

According to a further embodiment of the invention, the sleeve-like member has an upper edge and a lower edge. The sleeve-like member may also have different cross-sectional shapes, compare the above-mentioned previously published documents. For instance, the sleeve-like member may have a substantially circular-cylindrical shape. Advantageously, the sleeve-like member may also include a number of ridges, which project inwardly towards the longitudinal axis and extend substantially in parallel with the longitudinal axis for abutment to the fuel rod to be received in the cell. Said ridges may extend from the upper edge to the lower edge. Such ridges ensure a long abutment line to the fuel rod and thus a relatively small wear of the cladding tube of the fuel rod. Furthermore, each sleeve-like member may include at least four of said ridges.

According to a further embodiment of the invention, the lower edge, seen transversely to the longitudinal axis, has a wave-like shape with wave peaks and wave valleys and the upper edge, seen transversely to the longitudinal axis, has a wave-like shape with wave peaks and wave valleys. Said wave peaks may then be aligned with a respective one of said ridges, wherein said wave valleys are located between two adjacent ones of said ridges. In such a spacer, the sleeve-like members thus have ridges having a long axial extension, which ensures a long abutment line to a fuel rod extending through the sleeve-like member. The abutment line is especially long in relation to the length and weight of sleeve-like member. By such a long abutment, a small wear of the cladding tube of the fuel rod is achieved. Furthermore, each such sleeve-like member has on each side of each ridge, i.e. at the wave valleys, a substantially shorter extension in parallel with the longitudinal axis than at the ridges and the wave peaks. By such a design, a flexibility of the sleeve-like member is also created so that the sleeve-like member at the ridges may move radially and inwardly and outwardly and at the same time the ridges are permitted to turn around a centrepoint in a radial plane. The sleeve-like member thus permits a certain inclination of the fuel rod. Consequently, a uniform abutment to the fuel rod is achieved along the whole length of the ridge also at an outward bending of the fuel rod or at other axial and/or radial dimension changes of the fuel rod. The wave-like shape of the lower edge also reduces the risk of possible debris particles in the coolant flow getting caught in the spacer and wearing the fuel rod.

According to a further embodiment of the invention, the sleeve-like members abut each other in the spacer along a connection area extending in parallel to the longitudinal axis between one of said wave valleys of the upper edge and one of said wave valleys of the lower edge. Advantageously, the sleeve-like members are permanently connected to each other by means of weld joints, wherein said weld joint may include an edge weld at said connection area at least one of the upper edge and the lower edge.

According to a further embodiment of the invention, the sleeve-like member, seen in the direction of the longitudinal axis, has four substantially orthogonal long sides, wherein each long side may include one of said ridges. Advantageously, said vane may extend outwardly from one of said long sides. Such long sides provide a suitable elasticity to the sleeve-like member and especially to the ridges which are to abut the fuel rod. Each long side may then include one of said wave peaks of the upper edge and one of said wave peaks of the lower edge. Furthermore, the sleeve-like member, seen in the direction of the longitudinal axis, advantageously has four substantially orthogonal short sides, wherein each short side connects two of said long sides and includes with one portion of one of said wave valleys of the upper edge and a portion of one of said wave valleys of the lower edge. Said edge portion may be substantially straight and perpendicular to the longitudinal axis and is thus suitable for being welded to a corresponding portion of an adjacent sleeve-like member.

The object is also achieved by the fuel unit initially defined, which is characterised in that substantially each sleeve-like is manufactured in a sheet-shaped material that is bent to the sleeve-like shape.

BRIEF DESCRIPTION OF THE DRAWINGS

The present invention is now to be explained more closely by means of various embodiments and with reference to the drawings attached hereto.

FIG. 3 discloses schematically a fuel assembly for a pressure water reactor and with one fuel unit.

FIG. 4 discloses a side view of a spacer for a fuel unit

FIG. 5 discloses a view from above of the spacer in FIG. 4

FIG. 8 discloses a side view of a sheet-shaped material for forming the sleeve-like member in FIG. 6

FIG. 9 discloses a plan view of sheet-shaped material in FIG. 8

FIG. 12 discloses a side view of an inner edge element of the spacer in FIG. 4

FIG. 13 discloses a plan view of the inner edge element in FIG. 12.

DETAILED DESCRIPTION OF VARIOUS EMBODIMENTS OF THE INVENTION

Figure 1:
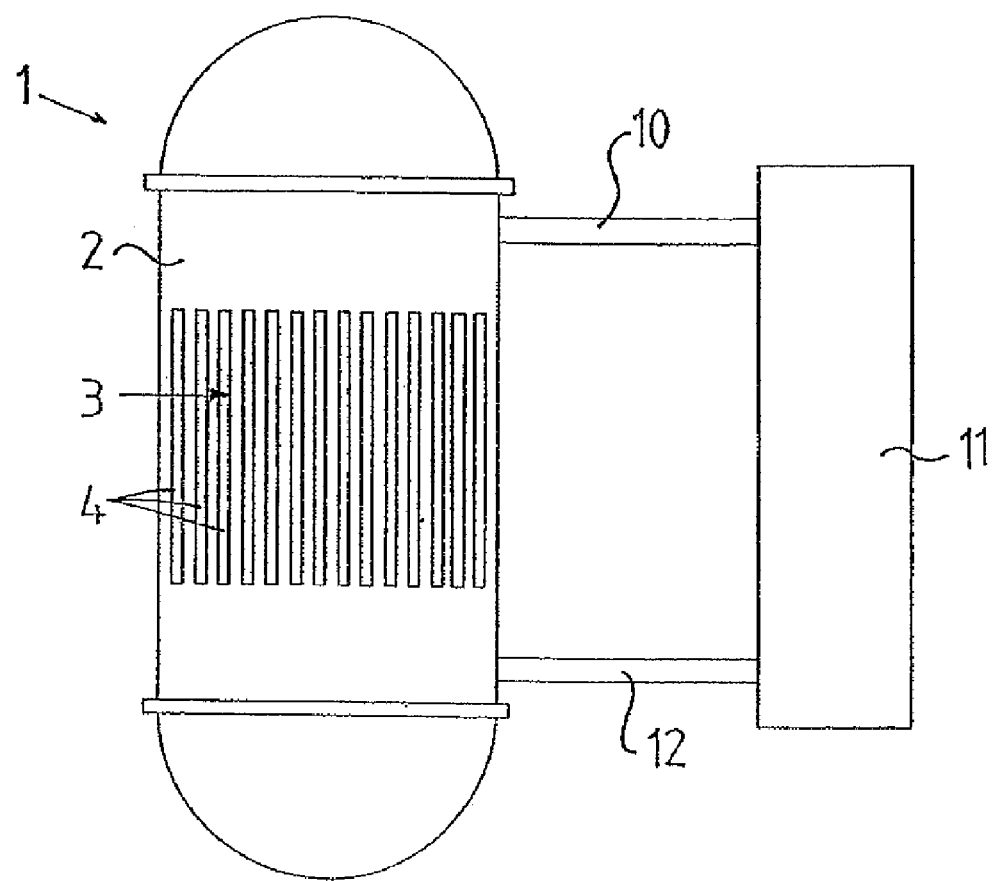
FIG. 1 discloses schematically a nuclear plant

FIG. 1 discloses schematically a nuclear plant including a reactor 1. The reactor 1 includes a reactor vessel 2 enclosing a core. The core 3 includes a number of fuel assemblies 4, which each includes a number of fuel rods 5, see FIGS. 2 and 3. Each fuel rod 5 includes a cladding tube and a nuclear fuel in the form of a pile with fuel pellets (not disclosed), which are enclosed in the cladding tube. Through the nuclear plant a coolant, in this case water, is flowing, which is heated by the nuclear reaction in the nuclear fuel. The coolant flows through the core 3 and into each fuel assembly 4 in contact with each fuel rod 5. The heated coolant is conveyed via a first connection 10 to a plant 11 for obtaining heat energy from the coolant. The plant 11 may include a turbine and a condenser. The cooled coolant is conveyed back to the reactor via a second connection 12. The reactor 1 may be of a boiling water type, BWR, wherein the coolant is vaporised in the core 3 and conveyed to the plant 11 as steam for driving a steam turbine. The reactor 1 may also be of a pressure water type, PWR, wherein the coolant is not vaporised but conveyed to a heat exchanger of the plant 11 for vaporising a medium in another circuit including a turbine.

Figure 2:
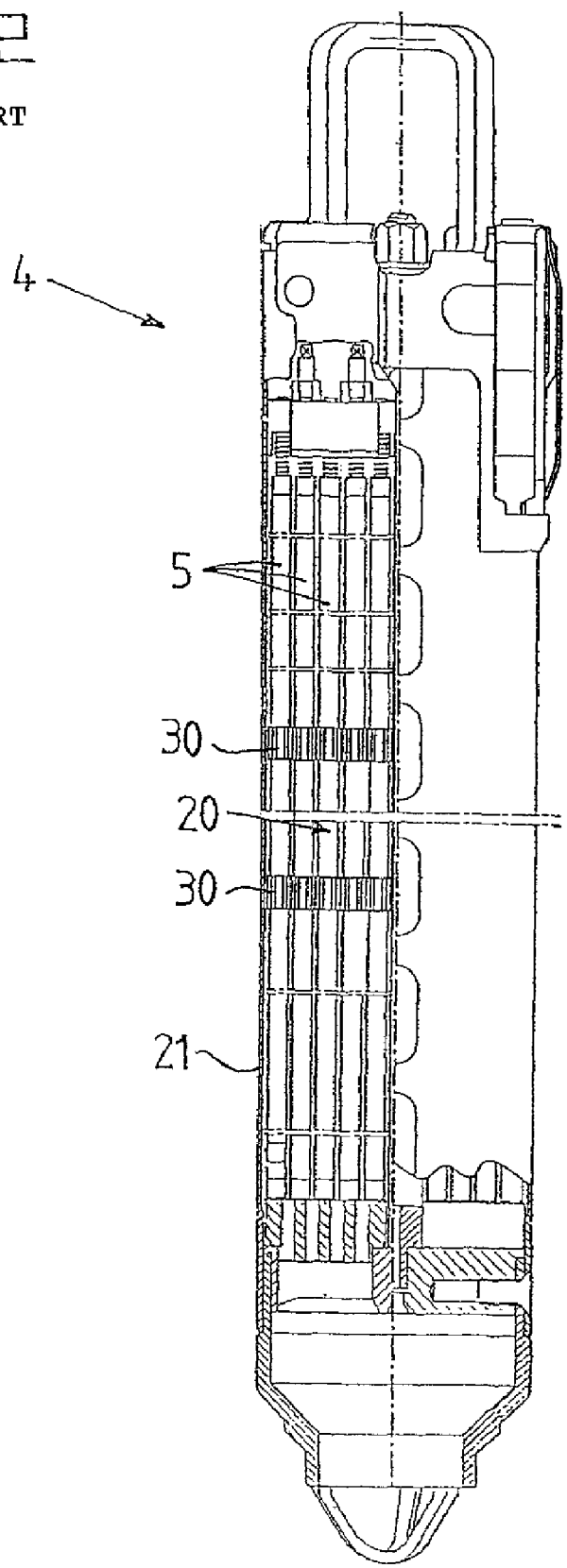
FIG. 2 discloses schematically a fuel assembly for a boiling water reactor and with four fuel units.

FIG. 2 discloses schematically a fuel assembly 4 for a boiling water reactor. In the embodiment disclosed, the fuel assembly 4 includes four fuel units 20, which each includes a plurality of fuel rods 5 and is located in a respective space in a box 21. Between these spaces and the four fuel units 20 coolant channels extend. Each fuel unit 20 is kept together by means of a number of spacers 30, for instance six to ten spacers 30. A fuel assembly 4 with this principle design is disclosed in the initially mentioned document U.S. Pat. No. 5,875,223.

FIG. 3 discloses schematically a fuel assembly 4 for a pressure water reactor. The fuel assembly 4 includes a fuel unit 20, which includes a plurality of fuel rods 5. The fuel assembly 4 normally includes an upper tie plate 25, a lower tie plate 26 and a number of guide tubes 27, which extend between and connect the tie plates 25 and 26 and which may be arranged to receive a control rod (not disclosed). The fuel rods 5 in the fuel unit 20 are kept together by means of a number of spacers 30, for instance six to eight spacers 30. The fuel unit 20 is also connected to the guide tubes 27 via the spacers 30 in a manner known per se.

The design and the manufacturing of the spacers 30 is now to be explained more closely with reference to FIGS. 4-13. In the embodiment disclosed in FIGS. 4-13, the spacers 30 are intended for a fuel assembly 4 for a reactor 1 of a boiling water type and including four fuel units 20. However, it is to be noted that the invention also is applicable to fuel assemblies intended for boiling water reactors and including another number than four fuel units, for instance one fuel unit. The invention is also applicable to fuel assemblies 4 for reactors 1 of pressure water type, see FIG. 3.

Figure 6:
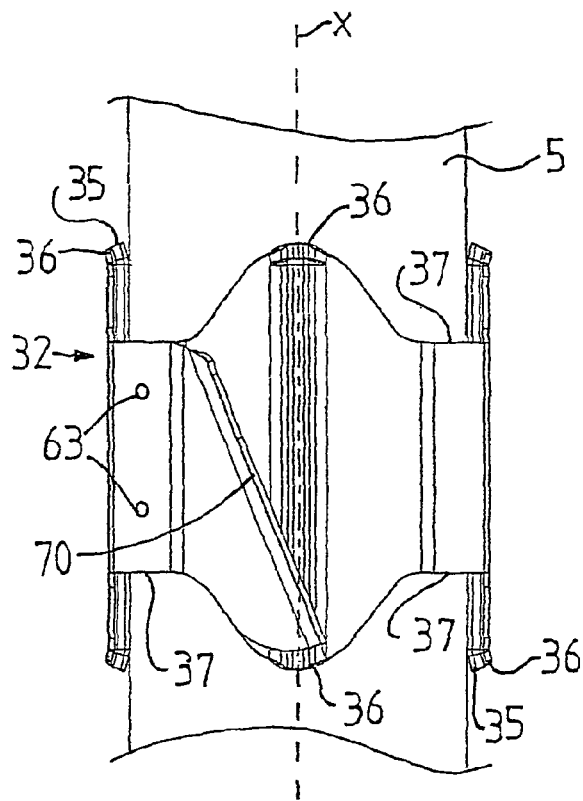
FIG. 6 discloses a side view of a sleeve-like member of the spacer in FIG. 4
Figure 7:
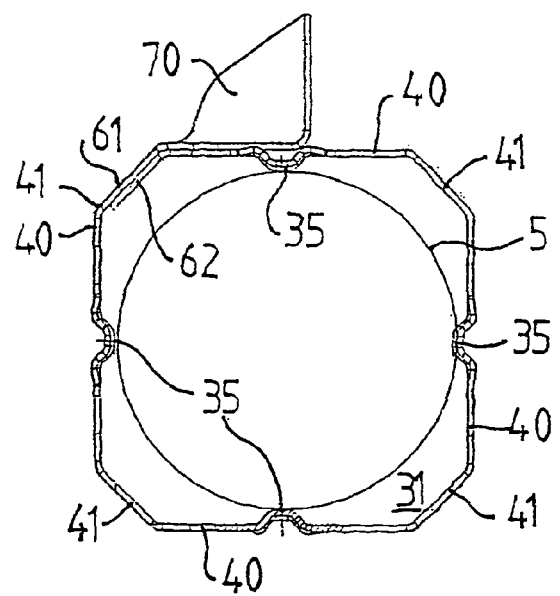
FIG. 7 discloses a plan view of the sleeve-like member in FIG. 6
Figure 10:
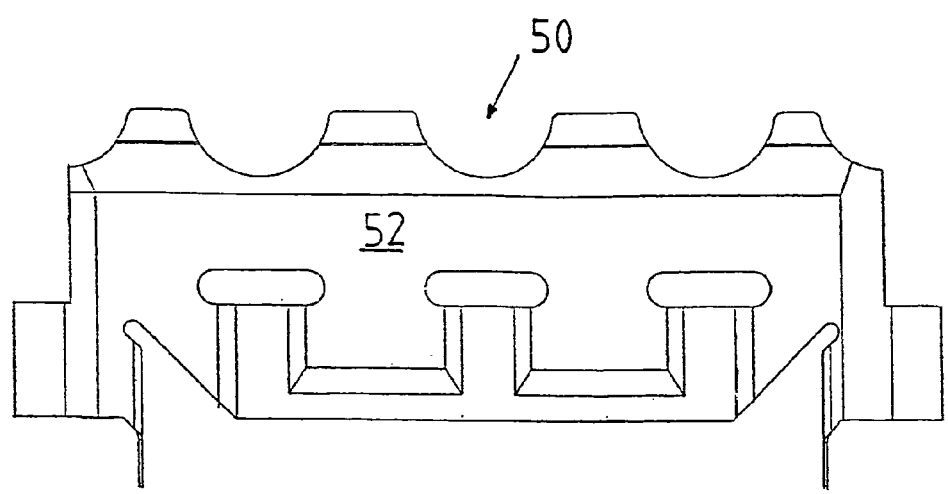
FIG. 10 discloses a side view of an outer edge element of the spacer in FIG. 4
Figure 11:
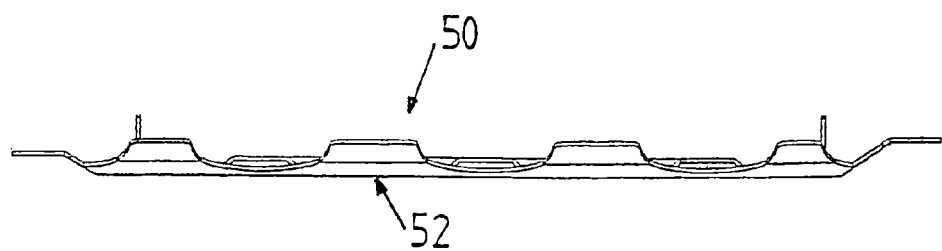
FIG. 11 discloses a plan view of the outer edge element in FIG. 10

The spacer 30 encloses a number of cells 31, which each has a longitudinal axis x, see FIG. 6, which is intended to extend substantially vertically when the fuel unit 20 is located in a reactor 1. Each such cell 31 is in the embodiment disclosed arranged to receive a fuel rod 5 in such a way that the fuel rod 5 extends in parallel with the longitudinal axis x.

Each cell 31 is formed by a sleeve-like member 32, see FIGS. 6-9, which has an upper edge 33 and a lower edge 34. The sleeve-like member 32 also includes four ridges 35 projecting inwardly towards the longitudinal axis x and to the fuel rod 5 extending through the cell 31. Each ridge 35 extends substantially in parallel with the longitudinal axis x along substantially the whole length of the sleeve-like member 32 from the upper edge 33 to the lower edge 34. Thanks to the fact that the ridges 35 project towards the fuel rod a relatively wide gap is created between the fuel rod 5 and the sleeve-like member in the proximity of the ridges 35. In such a way a proper cooling is ensured.

The upper edge 33 and the lower edge 34 have, seen transversely to the longitudinal axis x, a wave-like shape with wave peaks 38 and wave valleys 37. The wave peaks 36 of the upper edge 33 are aligned with a respective wave peak 36 of the lower edge 34 and with a respective one of the ridges 35. The wave valleys 37 of the upper edge 33 are aligned with a respective wave valley 37 of the lower edge. The wave valleys 37 are located between two adjacent ridges 35.

Each sleeve-like member 32 has, seen in the longitudinal direction of the axis x, four substantially orthogonal long sides 40, which each includes one of the ridges 35. Each long side 40 thus also includes one of the wave peaks 36 of the upper edge 33 and one of the wave peaks 36 of the lower edge 34. Furthermore, each sleeve-like member 32 has, seen in direction of the longitudinal axis x, four substantially orthogonal short sides 41. Each short side 41 connects two of the long sides 40. Each sleeve-like member 32 thus has, seen in the direction of the longitudinal axis x, an octagonal basic shape, see FIG. 7. However, it is to be noted that this basic shape may vary, for instance the sleeve-like members 32 may have a more circular cylindrical shape or a more square shape. Each short side 41 includes a portion of one of the wave valleys 37 of the upper edge 33 and a portion of one of the wave valleys 37 of the lower edge 34. These portions are substantially straight and perpendicular to the longitudinal axis x.

The sleeve-like members 32 abut, as appears from FIG. 5, each other in the spacer 30 along a connection area formed by the short sides 41 of two adjacent sleeve-like members 34. This connection area thus extends in parallel to the longitudinal axis x between the above-mentioned portion of one of wave valleys 37 of the upper edges 33 and the above-mentioned portion of one the wave valleys 37 of the lower edges 34. Furthermore, the sleeve-like members 32 are permanently connected to each other by means of weld joints. Each such weld joint includes an edge weld at said connection area at least one of the upper edge 33 and the lower edge 34. Preferably one such edge weld is provided both at the upper edge 33 and the lower edge 34. Since the edge welds in this case are located at the opposite wave valleys 37 they will be relatively close to each other which is advantageous from a strength point of view. The substantially straight portions are suitable for the application of such edge welds.

The spacer 30 has, seen in the direction of the longitudinal axis x, a substantially square shape, see FIG. 5. The spacer 30 includes at least two separate outer edge elements 50, which extend along a respective side of the spacer 30. One such outer edge element 50 is disclosed more closely in FIGS. 10 and 11. The spacer 30 also includes a separate outer edge element 51, which extends along two of the sides of the spacer 30. The inner edge element 51 is disclosed more closely in FIGS. 12 and 13. The edge elements 50, 51 thus create a non-closed or open frame contributing to the strength of the spacer 30 and providing outer surfaces 52 of the spacer 30. These outer surfaces 52 facilitate the introduction of the fuel unit 20 into the box 21 and create a hydraulic damping to the inner wall of the box 21. Thanks to the fact that the frame is open in three corners, the sleeve-like members 32 in these corners are permitted to move elastically outwardly. As is clear from FIG. 4, the edge elements 50, 51 have a longer extension in a vertical direction, i.e. in parallel with the longitudinal axis x, than the sleeve-like members 32. In particular, the edge elements 50, 51 extend a significant distance above the upper ends of the sleeve-like members 32, which is located at the level of the wave peaks 36.

As is clear from FIG. 5, one of the four corners of the spacer 30 is reduced through the lack of one outer sleeve-like member 32. The purpose of this reduction is to create space for a central water channel through the box 21. The inner edge element 51 extends around the reduced corner. The inner edge element 51 thus is turned inwardly in the box 21 to the central water channel. The inner edge element 51 also includes a vane 53, which is located at said reduced corner and which is inclined upwardly and inwardly to a centre of the spacer 30.

The sleeve-like members 32 are manufactured in a nickel-based alloy such as Alloy X-750, Alloy 718, Alloy 650, Alloy 690 or Alloy 600. The sleeve-like members 32 may also be manufactured in a zirconium-based alloy, such as various types of Zircaloy alloys, in stainless steel or in combinations of these alloys. An important aspect is however that the sleeve-like members 32 are to have a small thickness of material, which is less than 0.24 mm, less than or equal to 0.20 mm or less than or equal to 0.18 mm.

According to a first alternative the sleeve-like member 32 is manufactured in a sheet-shaped material in the form of a sheet band 60, see FIGS. 8 and 9. The sheet band 60 has the thickness of material mentioned above. During the manufacturing a sheet is worked to the sheet band 60 with the shape disclosed in FIGS. 8 and 9, for instance by means of punching. The sheet band 60 is then bent to the sleeve-like shape. The sheet band 60 has before this bending a first connection portion 61 in the proximity of a first end of the sheet band 60 and a second connection portion 62 in the proximity of the second end of the sheet band 60. The sheet band 60 is bent in such a way that, after the bending, the first connection portion 61 overlaps the second connection portion 62. After the bending, the connection portions 61 and 62 are connected to each other through the application of a weld joint, for instance in the form of two spot welds 63, which extend through the two portions 61 and 62, see FIG. 6. Since the sheet band 60 has a small thickness of material, the above-mentioned overlap may be permitted with the maintenance of a total small amount of material of the sleeve-like member 32 and without any negative effect on the flow resistance. The manufacturing of the sleeve-like member 32 is with this method very easy and the upper and lower edges 33, 34 may in an easy manner be given the disclosed wave-like shape. A further advantage is that the size of sleeve-like member 32 with regard to the outer diameter seen in the direction of the longitudinal axis x may vary in an easy manner. This is essential since the sleeve-like members 32 in a spacer normally include sleeve-like members 32 with different diameters.

During the manufacturing of the spacer, the different sheet bands 60 are thus bent in the manner described above. Advantageously, the individual bent sheet bands 60 are welded by means of the above-mentioned spot weld or spot welds 63 for keeping the sleeve-like members 32 together during the mounting of the spacer 30 proper. However, it is possible to replace this or these spot welds 63 with a more or less temporary connection during the mounting of the spacer 30 proper, for instance brazing. The sleeve-like members 32 are then positioned in a fixture of the like in the position it is to have in the spacer 30. Thereafter, the sleeve-like members 32 are welded together by means of the above-mentioned edge welds along said portions of the wave valleys 37. The edge welds may advantageously be performed as melt welds by means of laser welding or electron-beam welding.

It is also possible to position the bent sheet bands 60 directly in a fixture which keeps these during the welding by means of the above-mentioned edge welds, i.e. without any joining of the end portions 61, 62 of the sheet bands 60.

The edge elements 50, 51 may then be positioned against the sleeve-like members 32 in the above-mentioned fixture or the like and welded to the sleeve-like members 32 in connection with the application of said edge welds. It is also possible to apply and weld the edge elements 50, 51 firstly after the sleeve-like members 32 have been welded to each other.

According to a second alternative, the sleeve-like member 32 is manufactured from a tubular material having the above-mentioned thickness of material. The tubular material may be cut to a suitable size whereafter the upper edge 33 and the lower edge 34 are worked to the wave-like shaped disclosed. The disclosed ridges may be obtained through a pressing operation or be provided on the original tubular material.

At least some of the spacers 30 in the fuel unit 20 include one or several vanes 70 for influencing the coolant flow. With such a vane 70, the coolant may for instance be guided in a direction towards at least one adjacent fuel rod 5. With such a vane 70, turbulence in the coolant flow may also be created. Advantageously, such a vane 70 is formed by a portion 64 of material, which extends from the first connection portion 61, see FIG. 8. Such a vane 70 may be manufactured in an easy manner through a bending outwardly of the portion of material 64 outside the first connection portion 61 along a folding line 71 in such a way that the vane 70 extends outwardly form one of the long sides 40 and is inclined in relation to the longitudinal axis x.

According to another embodiment, the sleeve-like member 32 may include a slit 72, which extends from the upper edge 33 and/or the lower edge 34, see FIG. 8. The slit 71 permits bending outwardly of a part of a sheet band 60 or the tubular material for forming of the vane 70, see also WO02/03394, which discloses how such a vane 70 may be provided.

The invention is not limited to the embodiments disclosed but may be varied and modified within the scope of the following claims. For instance it is to be noted that the wave shape defined may include all imaginable wave shapes, such as a pure sinus wave, a square wave, a triangular wave and mixtures of these shapes.

The invention claimed is:

1. A spacer for holding a number of elongated fuel rods intended to be located in a nuclear plant, wherein said spacer encloses a plurality of sleeves, each forming a cell having a longitudinal axis and arranged to receive a fuel rod in such a way that the fuel rod extends substantially parallel with the longitudinal axis,
    the sleeves being permanently connected to each other in the spacer,
    each sleeve forming a single cell arranged to receive a single one of the fuel rods,
    each sleeve being manufactured of a sheet-shaped material of a nickel-based alloy,
    the sheet-shaped material having a first end and a second end and comprising a first connection portion in the proximity of the first end and a second connection portion in the proximity of the second end,
    the sheet-shaped material being formed into a substantially cylindrical shape in such a way that the first end overlaps the second end, wherein the sheet-shaped material extends around the single cell dimensioned for housing the single one of the fuel rods,
    the sheet-shaped material having a material thickness, which is less than about 0.20 mm, and
    each sleeve comprising at least one weld joint permanently connecting the first connection portion and the second connection portion to each other.

2. A spacer according to claim 1, wherein said weld joint includes a spot weld.

3. A spacer according to claim 1, wherein the nuclear plant is arranged to permit re-circulation of a coolant flow and wherein the spacer is arranged to be located in the coolant flow, the spacer including at least one vane for influencing the coolant flow.

4. A spacer according to claim 3, wherein said vane is formed by a portion of the material, which extends from the first connection portion.

5. A spacer according to claim 3, wherein said vane is inclined in relation to the longitudinal axis.

6. A spacer according to claim 1, wherein the sheet-shaped material has a material thickness, which is less than or equal to about 0.18 mm.

7. A spacer according to claim 1, wherein the sleeve has an upper edge and a lower edge.

8. A spacer according to claim 7, wherein the sleeve includes a number of ridges, which project inwardly towards the longitudinal axis and extend substantially in parallel with the longitudinal axis for abutment to the fuel rod to be received in the cell.

9. A spacer according to claim 8, wherein said ridges extend from the upper edge to the lower edge.

10. A spacer according to claim 8, wherein each sleeve includes at least four of said ridges.

11. A spacer according to claim 7, wherein the lower edge, seen transversely to the longitudinal axis, has a wave shape with wave peaks and wave valleys and that the upper edge, seen transversely to the longitudinal axis, has a wave shape with wave peaks and wave valleys.

12. A spacer according to claim 11, wherein the sleeve includes a number of ridges which project inwardly towards the longitudinal axis and extend substantially in parallel with the longitudinal axis for abutment to the fuel rod to be received in the cell, and wherein said wave peaks are aligned with a respective one of said ridges, and wherein said wave valleys are located between two adjacent ones of said ridges.

13. A spacer according to claim 11, wherein the sleeves abut each other in the spacer along a connection area extending in parallel to the longitudinal axis between one of said wave valleys of the upper edge and one of said wave valleys of the lower edge.

14. A spacer according to claim 13, wherein the sleeves are permanently connected to each other by means of weld joints.

15. A spacer according to claim 13, wherein said weld joint includes an edged weld at said connection area at least one of the upper edge and the lower edge.

16. A spacer according to claim 1, wherein the sleeve seen in the direction of the longitudinal axis has four substantially orthogonal long sides.

17. A spacer according to claim 16, wherein the sleeve includes a number of ridges which project inwardly towards the longitudinal axis and extend substantially in parallel with the longitudinal axis for abutment to the fuel rod to be received in the cell, and wherein each long side includes one of said ridges.

18. A spacer according to claim 16, wherein the nuclear plant is arrange to permit re-circulation of a coolant flow, wherein the spacer is arranged to be located in the coolant flow, the spacer including at least one vane for influencing the coolant flow, and wherein said vane extends outwardly from one of said four substantially orthogonal long sides.

19. A spacer according to claim 16, wherein the sleeve seen in the direction of the longitudinal axis has four substantially orthogonal short sides, wherein each short side connects two of said four substantially orthogonal long sides.

20. A spacer according to claim 19, wherein the sleeve has an upper edge and a lower edge, and wherein each short side includes a portion of one of said wave valleys of the upper edge and a portion of one said wave valleys of the lower edge.

21. A fuel unit for a nuclear plant comprising:
    a number of elongated fuel rods, and
    a number of spacers for holding the fuel rods, wherein the spacers enclose a plurality of sleeves, each forming a cell having a longitudinal axis and being arranged to receive one of said fuel rods in such a way that the fuel rod extends in parallel to the longitudinal axis, the sleeves being permanently connected to each other in the spacer, each sleeve forming a single cell arranged to receive a single one of the fuel rods, each sleeve being manufactured of a sheet-shaped material of a nickel-based alloy, the sheet-shaped material having a first end and a second end and comprising a first connection portion in the proximity of the first end and a second connection portion in the proximity of the second end, the sheet-shaped material being formed into a substantially cylindrical shape in such a way that the first end overlaps the second end, wherein the sheet-shaped material extends around the single cell dimensioned for housing the single one of the fuel rods, the sheet-shaped material having a material thickness, which is less than about 0.20 mm, and each sleeve comprising at least one weld joint permanently connecting the first connection portion and the second connection portion to each other.

* * * * *